(12) United States Patent
Lee

(10) Patent No.: US 7,272,923 B2
(45) Date of Patent: Sep. 25, 2007

(54) METHOD FOR FORMING DECORATIVE STAPLE STRIPS

(76) Inventor: Chung-Heng Lee, 74, Pao-Kao Road, Hsin-Tien City, Taipei 231 (TW)

( * ) Notice: Subject to any disclaimer, the term of this patent is extended or adjusted under 35 U.S.C. 154(b) by 0 days.

(21) Appl. No.: 11/633,247

(22) Filed: Dec. 4, 2006

(65) Prior Publication Data

US 2007/0104557 A1    May 10, 2007

Related U.S. Application Data

(63) Continuation-in-part of application No. 11/122,736, filed on May 5, 2005, now abandoned.

(51) Int. Cl.
*B21G 7/02* (2006.01)
(52) U.S. Cl. .............................. 59/77; 59/71; 411/461; 411/471
(58) Field of Classification Search ............. 59/71–77; 227/109, 144; 411/444, 523
See application file for complete search history.

(56) References Cited

U.S. PATENT DOCUMENTS

| 352,000 A | 11/1886 | Penfold |
|---|---|---|
| 538,730 A | 5/1895 | Ellingson |
| 589,854 A | 9/1897 | Sweet |
| 2,345,053 A | 3/1944 | Judd et al. |
| 2,361,501 A | 10/1944 | Salzber |
| 2,433,914 A | 1/1948 | Lang |
| 2,624,085 A | 1/1953 | Feiner |
| D231,902 S * | 6/1974 | Olson .......................... D8/389 |
| 4,220,070 A * | 9/1980 | Anstett ........................ 411/444 |
| 4,664,733 A * | 5/1987 | Masago ....................... 156/212 |
| 5,414,991 A | 5/1995 | Kfir et al. |
| 6,840,422 B2 * | 1/2005 | Mintzer ....................... 227/109 |

* cited by examiner

*Primary Examiner*—David B Jones
(74) *Attorney, Agent, or Firm*—Merchant & Gould P.C.

(57) ABSTRACT

A method for making decorative staple strips includes: cutting a thin metal sheet into a plurality of metal strips; assembling the metal strips; applying an adhesive to the assembled metal strips; subjecting the bonded metal strips to a punching process so as to form a non-folded strip unit in a unit length of the bonded metal strips such that the non-folded strip unit has two opposite pin-forming holes formed in the unit length of each of the bonded metal strips, each of the pin-forming holes having two opposite sides confined respectively by two pin-forming portions in the unit length of each of the bonded metal strips; separating the non-folded strip unit from the bonded metal strips; and folding the pin-forming portions of the non-folded strip unit.

7 Claims, 8 Drawing Sheets

METHOD FOR FORMING DECORATIVE STAPLE STRIPS

CROSS-REFERENCE TO RELATED APPLICATION

This application is a continuation-in-part (CIP) of U.S. patent application Ser. No. 11/122,736, filed by the applicant on May 5, 2005, and abandoned as of the filing date of this application.

BACKGROUND OF THE INVENTION

1. Field of the Invention

This invention relates to a method for making decorative staple strips, more particularly to a method involving the use of an adhesive for making decorative staple strips.

2. Description of the Related Art

U.S. Pat. No. 5,414,991 discloses a method for making decorative staple strips. The method includes inserting a metal sheet into a die configured to cut all the way through portions of the metal sheet to form at least one strip of staples, each having prongs and a bridging web. Each two adjacent staples are interconnected by at least one readily frangible segment of non-cut metal sheet. The prongs are then bent and the strip of staples is separated from the cut metal sheet by cutting techniques. As illustrated in FIG. 1, in order to separate each staple 11 from an adjacent one of the staples 11, slits 10 are formed using cutting techniques. Since the readily frangible segment 111 is required to be as small as possible to facilitate discharging of the staples 11 from a stapler (not shown), the width ($d_1$) of the slits 10 thus formed is relatively small. As a consequence, the cutting tool (not shown) used for forming the slits 10 is required to be very sharp, which has to be replaced when blunt and thus has a short service life. In addition, the presence of the readily frangible segment 111 required for keeping the staples 11 in a strip 1 during the cutting and bending operations results in an undesired sharp protrusion after separation from the staple strip 1, which not only can accidentally wound a person, but also has an adverse effect on the appearance of the staple 11. Moreover, control of the quality of the readily frangible segment 111 is relatively difficult. As a consequence, the size of the readily frangible segment 111 may be too large, which results in difficulty in discharging of the staple 11 from the staple strip 1 thus formed, or too small, which breaks undesirably when the staple strip 1 thus formed falls to the ground.

SUMMARY OF THE INVENTION

The object of the present invention is to provide a method for making decorative staple strips that can overcome the aforesaid drawbacks associated with the prior art.

According to this invention, there is provided a method for making decorative staple strips. The method comprises: cutting a thin metal sheet into a plurality of metal strips, each of which has two opposite long sides spaced apart by a width greater than 2 mm; assembling the metal strips in such a manner that each of the long sides of each of the metal strips is parallel to and adjoins an adjacent one of the long sides of an adjacent one of the metal strips; applying an adhesive to the assembled metal strips in such a manner that each of the long sides of each of the metal strips is bonded securely to the adjacent one of the long sides of the adjacent one of the metal strips through the adhesive; subjecting the bonded metal strips to a punching process so as to form a non-folded strip unit in a unit length of the bonded metal strips such that the non-folded strip unit has two opposite pin-forming holes formed in the unit length of each of the bonded metal strips, each of the pin-forming holes having two opposite sides confined respectively by two pin-forming portions in the unit length of each of the bonded metal strips; separating the non-folded strip unit from the bonded metal strips; and folding the pin-forming portions of the non-folded strip unit so as to form the non-folded strip unit into the staple strip.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
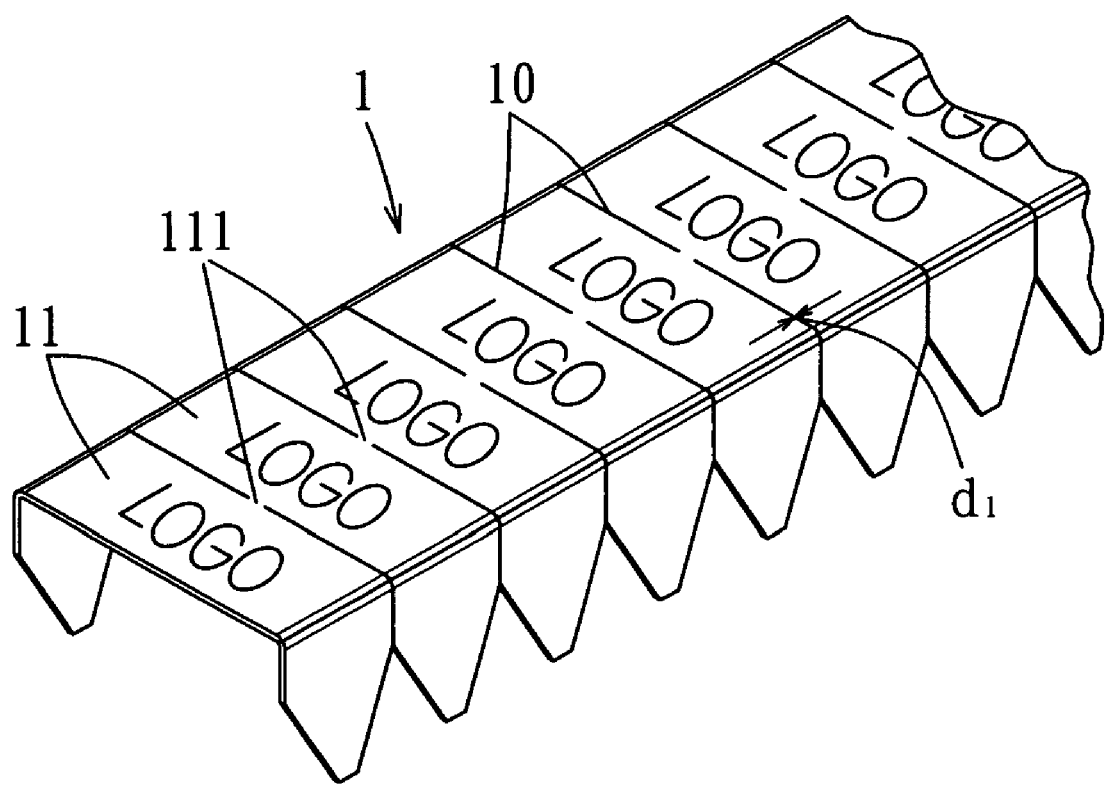
FIG. 1 is a fragmentary perspective view of a conventional staple strip.
Figure 2:
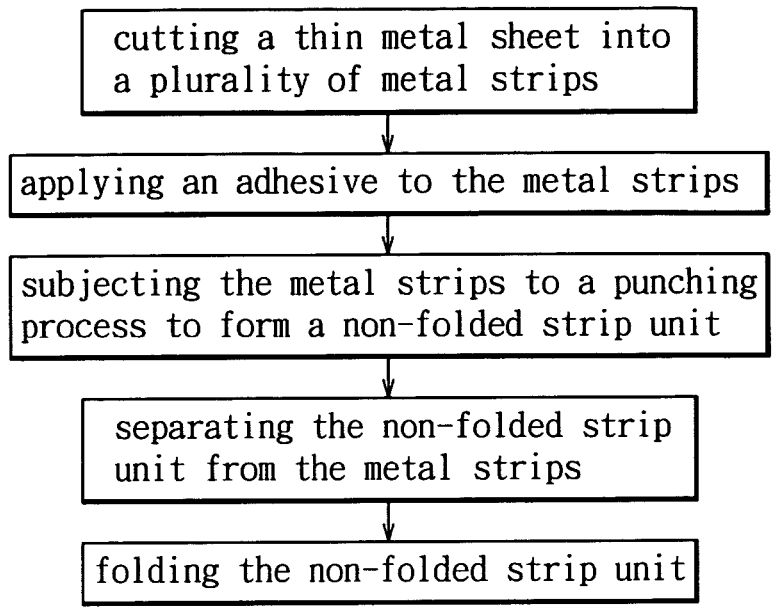
FIG. 2 is a flow chart illustrating consecutive steps of the preferred embodiment of a method for making decorative strips according to the present invention.
Figure 3:
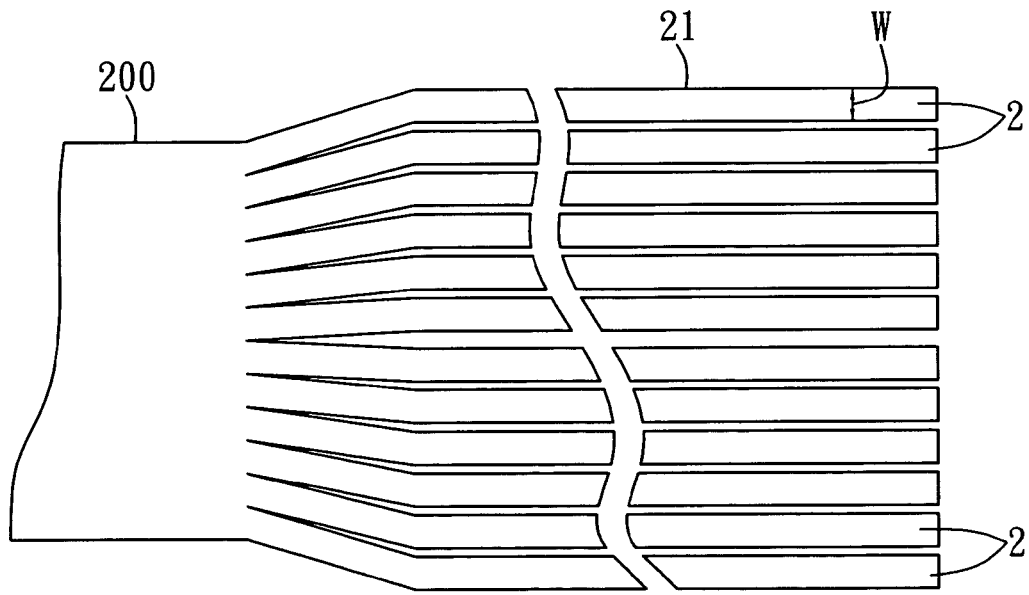
FIGS. 3 to 12 are schematic views to illustrate the consecutive steps of the preferred embodiment.
Figure 4:
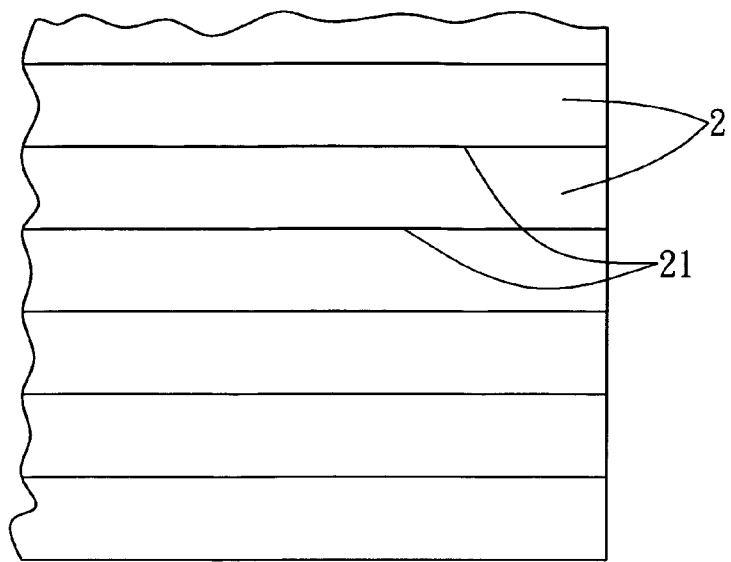
Figure 5:
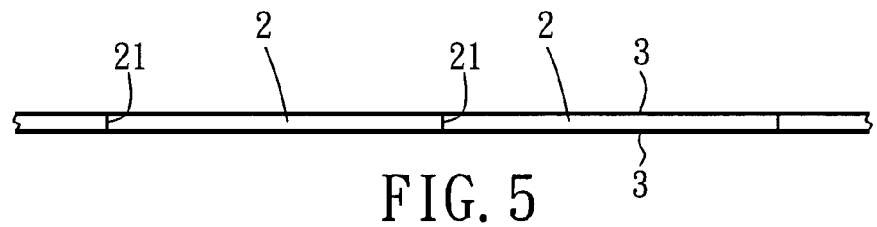
Figure 6:
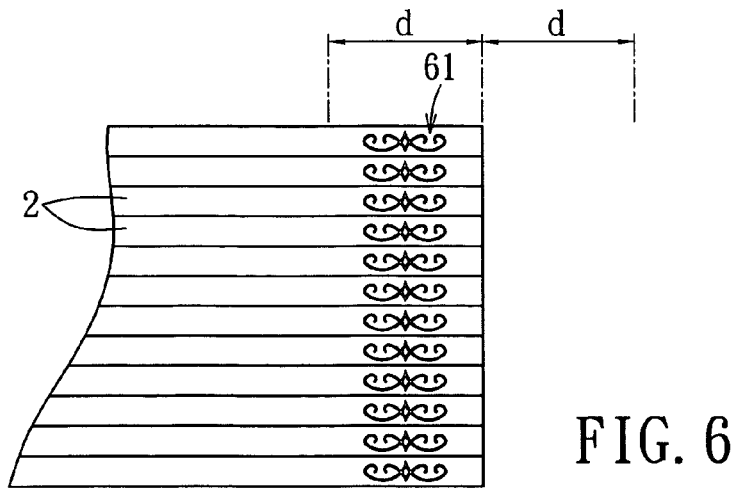
Figure 7:
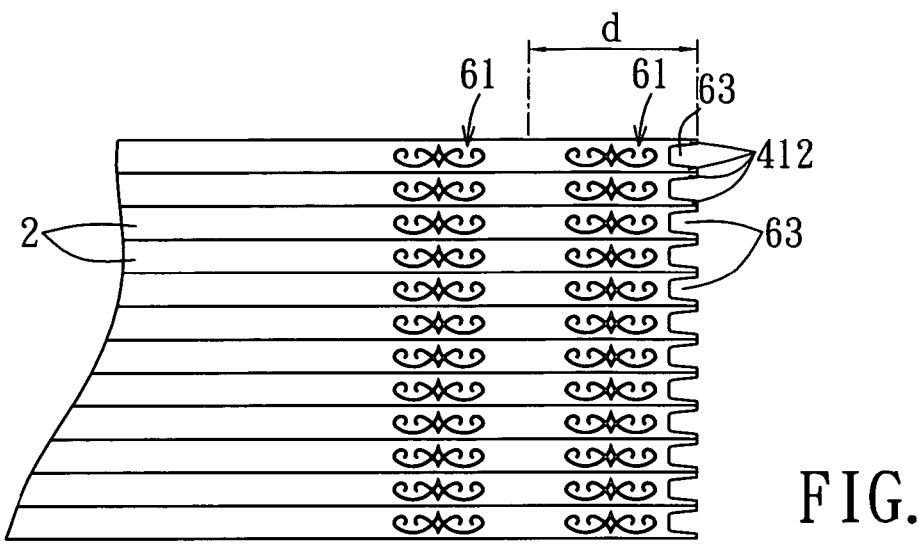
Figure 8:
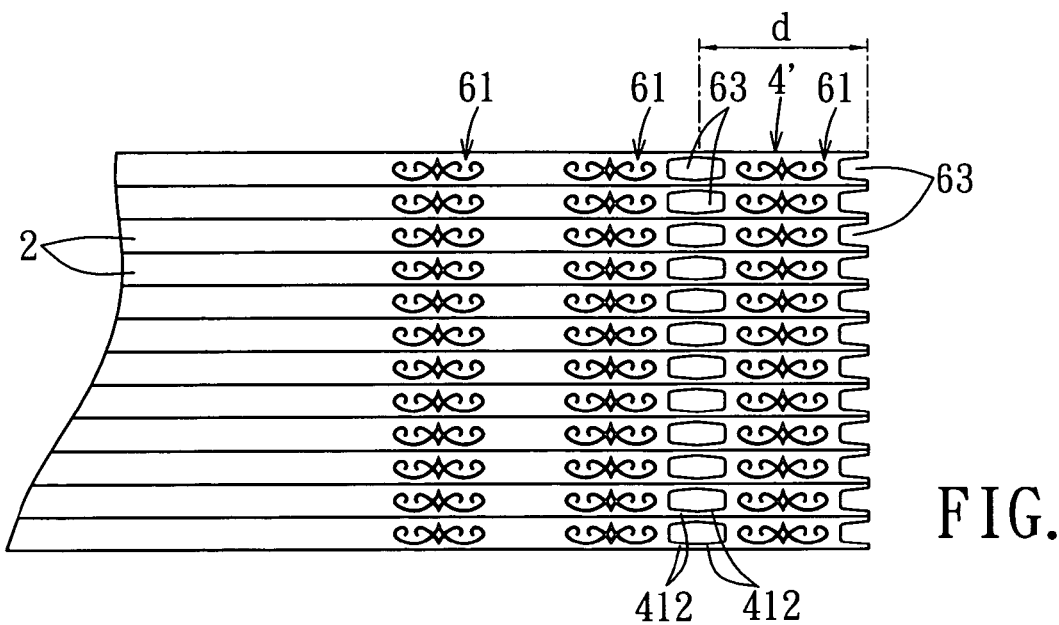
Figure 9:
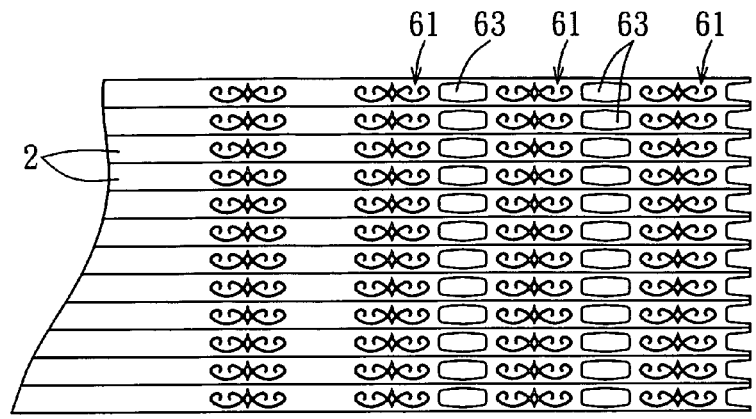
Figure 10:
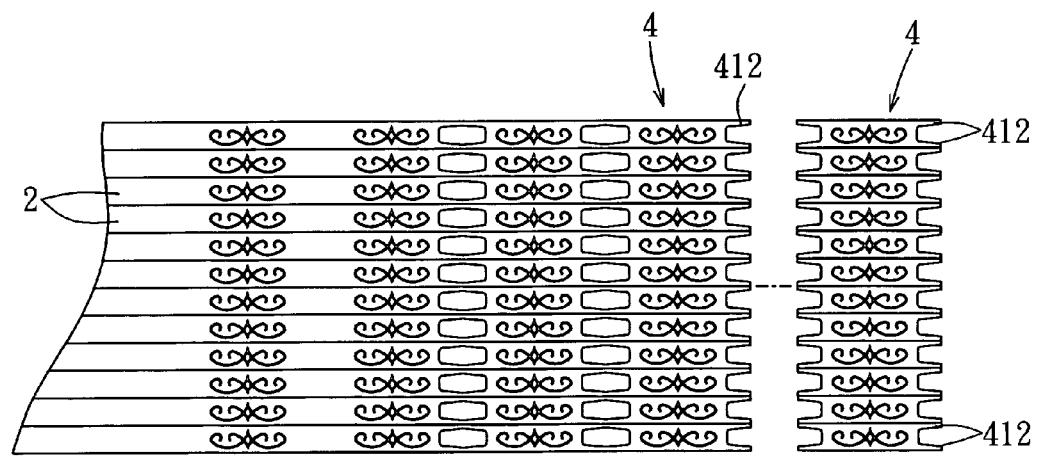
Figure 11:
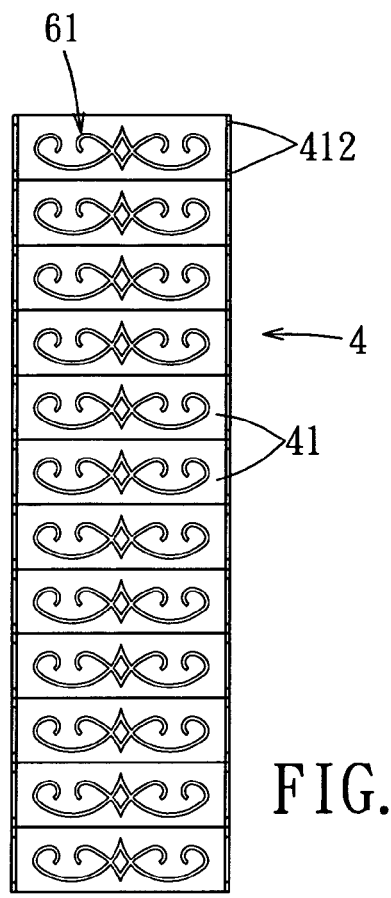

FIG. 2 illustrates consecutive steps of the preferred embodiment of a method for making decorative staple strips 4 (see FIGS. 11 and 12) according to this invention. Each of the staple strips 4 includes a plurality of interconnected staples 41. The method includes the steps of: cutting a thin metal sheet 200 into a plurality of metal strips 2 (see FIG. 3), each of which has two opposite long sides 21 spaced apart by a width (W) greater than 2 mm; assembling the metal strips 2 in such a manner that each of the long sides 21 of each of the metal strips 2 is parallel to and adjoins an adjacent one of the long sides 21 of an adjacent one of the metal strips 2 (see FIG. 4); applying an adhesive 3 to the assembled metal strips 2 in such a manner that each of the long sides 21 of each of the metal strips 2 is bonded securely to the adjacent one of the long sides 21 of the adjacent one of the metal strips 2 through the adhesive 3 (see FIG. 5); subjecting the bonded metal strips 2 to a pattern forming process so as to form a decorative pattern 61 in a unit length (d) of the bonded metal strips 2 (see FIG. 6); subjecting the bonded metal strips 2 to a punching process so as to form a non-folded strip unit 4' in the unit length (d) of the bonded metal strips 2 (see FIGS. 7 to 9) such that the non-folded strip unit 4' has two opposite pin-forming holes 63 formed in the unit length (d) of each of the bonded metal strips 2, each of the pin-forming holes 63 having two opposite sides confined respectively by two pin-forming portions 412 in the unit length (d) of each of the bonded metal strips 2, the decorative pattern 61 being disposed between the two pin-forming holes 63; separating the non-folded strip unit 4' from the bonded metal strips 2 by cutting techniques (see FIG. 10); and folding the pin-forming portions 412 of the non-folded strip unit 4' so as to form the non-folded strip unit 4' into the staple strip 4 (see FIGS. 11 and 12).

Formation of the staple strips 4 is conducted on a machine (not shown) that includes a series of stages which perform the pattern forming operation, the punching operation, the separating operation, and the folding operation upon advancing the assembled metal strips 2 one unit length (d) each time, as best illustrated in FIGS. 6 to 11.

Preferably, the adhesive 3 is applied to upper and lower surfaces of each of the assembled metal strips 2 (see FIG. 5), and is applied at least two times before the subsequent operations.

In this embodiment, the decorative pattern 61 is formed by embossing techniques after application of the adhesive 3 and before the formation of the pin-forming holes 63. Alternatively, the decorative pattern 61 can be formed by punching techniques or printing techniques, such as transfer printing techniques.

Figure 12:
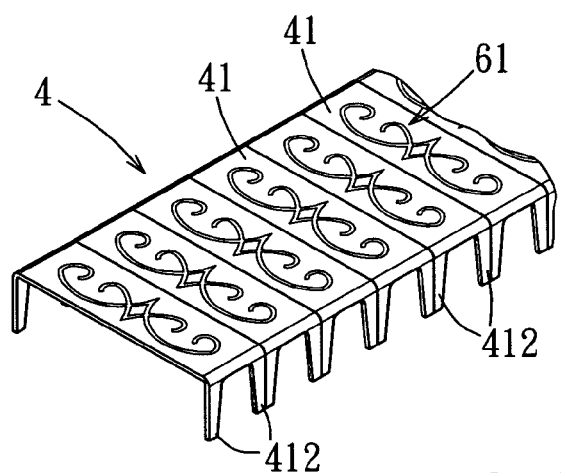
Figure 13:
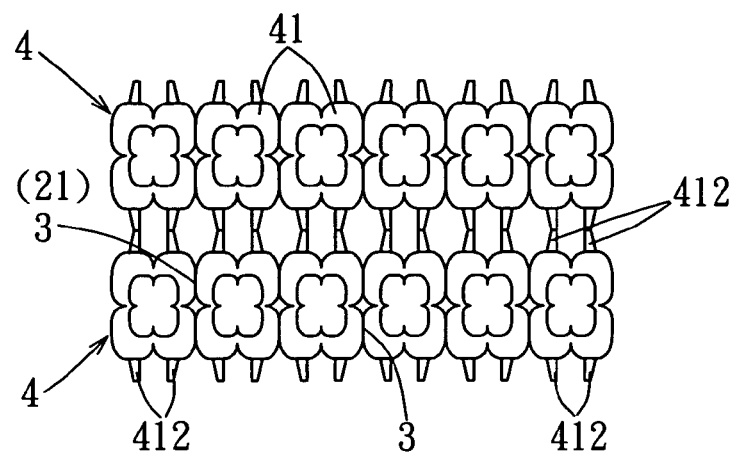
FIGS. 13 to 17 illustrate different configurations of the staple strips formed by the preferred embodiment.
Figure 14:
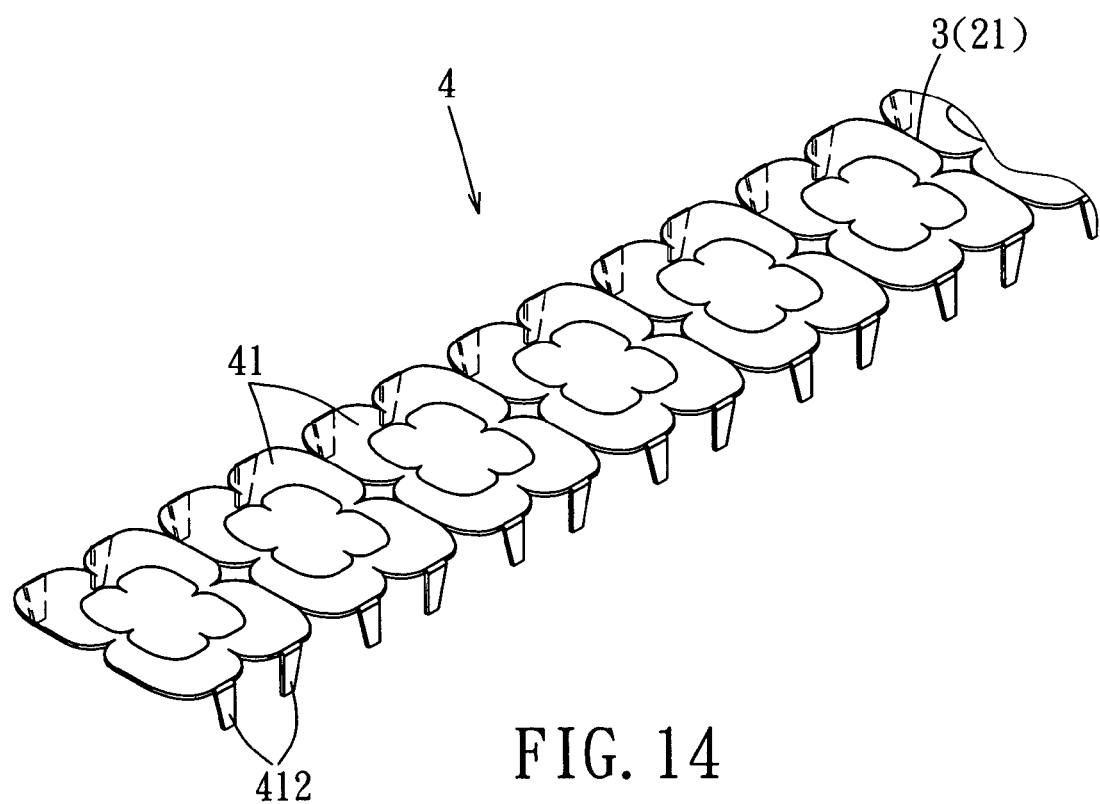
Figure 15:
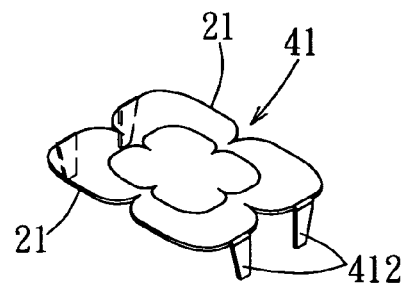

FIGS. 13 and 14 illustrate the staple strips 4 formed by the method of the preferred embodiment of this invention with a structure different from that of the staple strips 4 shown in FIG. 12. Since the staples 41 in the staple strip 4 are connected to each other through the adhesive 3, discharging of the staple 41 is easier than that of the afore said conventional staple strip, and unlike the conventional staple strip, which forms undesired sharp protrusions on the discharged staple, the sides 21 of the discharged staple 41 of the staple strip 4 of this invention are free from the undesired sharp protrusions, as best shown in FIG. 15. In addition, by virtue of the adhesive 3, which has an excellent resilient property, connection between adjacent ones of the staples 41 of this invention is enhanced such that the staple strip 4 does not break easily when subjected to an impact, such as upon falling to the ground.

Figure 16:
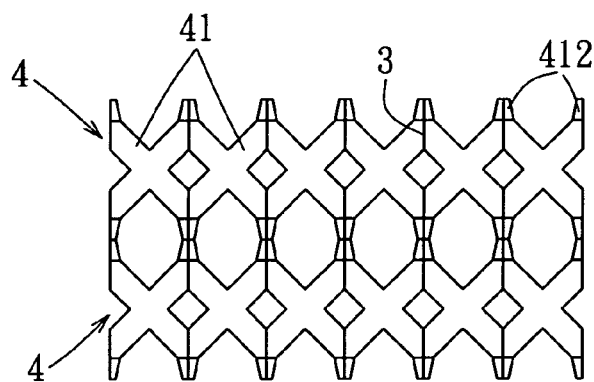
Figure 17:
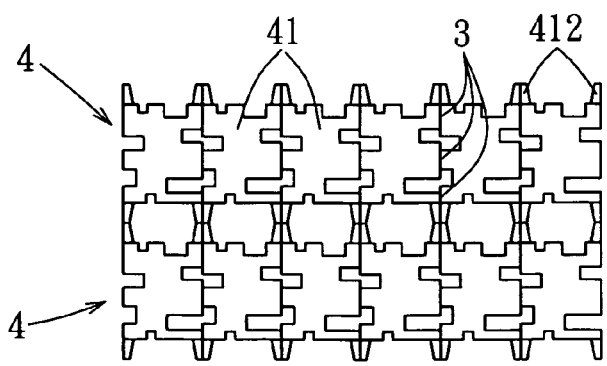

FIGS. 16 and 17 illustrate different structures of the staple strips 4 formed by the method of the preferred embodiment of this invention.

Since the metal sheet 200 is cut into the metal strips 2 which are subsequently assembled using the adhesive 3, formation of the slits required in the conventional method of forming the conventional staple strip is dispensed with. Hence, the aforesaid drawbacks resulting from the slits in the conventional method are eliminated in the method of this invention.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A method for making decorative staple strips, comprising:

cutting a thin metal sheet into a plurality of metal strips, each of which has two opposite long sides spaced apart by a width greater than 2 mm;

assembling the metal strips in such a manner that each of the long sides of each of the metal strips is parallel to and adjoins an adjacent one of the long sides of an adjacent one of the metal strips;

applying an adhesive to the assembled metal strips in such a manner that each of the long sides of each of the metal strips is bonded securely to the adjacent one of the long sides of the adjacent one of the metal strips through the adhesive;

subjecting the bonded metal strips to a punching process so as to form a non-folded strip unit in a unit length of the bonded metal strips such that the non-folded strip unit has two opposite pin-forming holes formed in the unit length of each of the bonded metal strips, each of the pin-forming holes having two opposite sides confined respectively by two pin-forming portions in the unit length of each of the bonded metal strips;

separating the non-folded strip unit from the bonded metal strips; and folding the pin-forming portions of the non-folded strip unit so as to form the non-folded strip unit into the staple strip.

2. The method of claim 1, wherein the adhesive is applied to upper and lower surfaces of each of the assembled metal strips.

3. The method of claim 2, wherein the adhesive is applied at least two times to the upper and lower surfaces of each of the assembled metal strips.

4. The method of claim 1, further comprising forming a decorative pattern in the unit length of the bonded metal strips, the decorative pattern being disposed between the two pin-forming holes.

5. The method of claim 4, wherein the decorative pattern is formed by punching techniques after application of the adhesive and before the formation of the pin-forming holes.

6. The method of claim 4, wherein the decorative pattern is formed by printing techniques after application of the adhesive and before the formation of the pin-forming holes.

7. The method of claim 4, wherein the decorative pattern is formed by embossing techniques after application of the adhesive and before the formation of the pin-forming holes.

\* \* \* \* \*